(12) United States Patent
Low et al.

(10) Patent No.: US 10,120,436 B2
(45) Date of Patent: Nov. 6, 2018

(54) APPARATUSES, SYSTEMS, AND METHODS FOR USB HIGH-SPEED CHIRP DETECTION

(71) Applicant: Intel Corporation, Santa Clara, CA (US)

(72) Inventors: Chia How Low, Simpang Ampat (MY); Jia Jun Lee, Seberang Jaya (MY)

(73) Assignee: INTEL CORPORATION, Santa Clara, CA (US)

( * ) Notice: Subject to any disclaimer, the term of this patent is extended or adjusted under 35 U.S.C. 154(b) by 166 days.

(21) Appl. No.: 15/078,886

(22) Filed: Mar. 23, 2016

(65) Prior Publication Data

US 2017/0277249 A1 Sep. 28, 2017

(51) Int. Cl.
*G06F 1/32* (2006.01)
*G06F 13/40* (2006.01)
*G06F 13/42* (2006.01)

(52) U.S. Cl.
CPC .......... *G06F 1/3293* (2013.01); *G06F 1/3296* (2013.01); *G06F 13/4022* (2013.01); *G06F 13/4282* (2013.01)

(58) Field of Classification Search
CPC ............. G06F 2213/0042; G06F 13/42; G06F 13/4282; G06F 13/4286; G06F 1/3293; G06F 1/3296; G06F 13/4022
See application file for complete search history.

(56) References Cited

U.S. PATENT DOCUMENTS

| | | | |
|---|---|---|---|
| 6,593,768 B1 | 7/2003 | Iyer et al. | |
| 7,711,975 B2 | 5/2010 | Choate | |
| 8,412,873 B2 | 4/2013 | Leydier et al. | |
| 8,812,878 B2 | 8/2014 | Tan et al. | |
| 9,093,971 B2 | 7/2015 | Aw | |
| 9,208,121 B2 | 12/2015 | Iyer et al. | |
| 2005/0026581 A1* | 2/2005 | Wood | H04L 25/085 455/219 |
| 2007/0241769 A1* | 10/2007 | Song | G06F 13/4072 326/30 |

(Continued)

OTHER PUBLICATIONS

"Universal Serial Bus Specification", Revision 2.0, The Universal Serial Bus Implementation Forum (USB-IF), (Portland, OR), (Apr. 27, 2000), 622 pgs.

*Primary Examiner* — Glenn A. Auve
(74) *Attorney, Agent, or Firm* — Nicholson De Vos Webster & Elliott LLP

(57) ABSTRACT

Methods and apparatuses relating to USB high-speed chirp detection are described. In one embodiment, a bus host transceiver circuit includes a first data path to connect to a bus device, a second data path to connect to the bus device, a squelch detection circuit with a first and a second input, and a switching circuit to couple the first data path to the first input of the squelch detection circuit separate from a first resistor and couple the second data path to the second input of the squelch detection circuit separate from a second resistor when in a first mode, and switch to a second mode to couple the first data path through the first resistor to the first input of the squelch detection circuit and couple the second data path through the second resistor to the second input of the squelch detection circuit when in a host reset period.

24 Claims, 7 Drawing Sheets

(56) References Cited

U.S. PATENT DOCUMENTS

| | | | | |
|---|---|---|---|---|
| 2011/0131356 A1* | 6/2011 | Devam | ............... | G06F 13/426 |
| | | | | 710/105 |
| 2012/0015617 A1* | 1/2012 | Srivastava | ............. | H03G 3/341 |
| | | | | 455/218 |
| 2012/0079308 A1* | 3/2012 | Sasaki | ............... | G06F 13/4072 |
| | | | | 713/340 |
| 2012/0317446 A1* | 12/2012 | Jaramillo | ............. | G06F 11/221 |
| | | | | 714/43 |
| 2013/0029622 A1* | 1/2013 | Zhan | ............... | H03G 3/344 |
| | | | | 455/218 |
| 2013/0251016 A1* | 9/2013 | Yap | ............... | G06F 1/3209 |
| | | | | 375/224 |
| 2014/0176193 A1* | 6/2014 | De Vita | ............... | H03K 5/2481 |
| | | | | 327/56 |
| 2016/0103781 A1* | 4/2016 | Lin | ............... | G06F 13/4282 |
| | | | | 375/139 |
| 2016/0282918 A1* | 9/2016 | Low | ............... | G06F 1/263 |
| 2017/0168979 A1* | 6/2017 | Remple | ............. | G06F 13/4282 |

* cited by examiner

APPARATUSES, SYSTEMS, AND METHODS FOR USB HIGH-SPEED CHIRP DETECTION

TECHNICAL FIELD

The disclosure relates generally to electronics, and, more specifically, an embodiment of the disclosure relates to a circuit for Universal Serial Bus (USB) high-speed chirp detection.

BACKGROUND

Electronics (e.g., computer systems) generally employ one or more electrical connections to facilitate the transmittal of data (e.g., communication) between devices, such as between a computing system and a (e.g., external) peripheral.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Electronics (e.g., computing systems) generally employ one or more electrical connections (e.g., a bus) to facilitate the transmittal of data (e.g., communication) between devices, such as, but not limited to, between a computing system (e.g., a computer including a hardware processor) and a (e.g., external) peripheral. Non-limiting examples of peripherals are external storage devices (e.g., hard disk drives) and mobile devices (e.g., smartphones and tablets).

Certain electrical connections (e.g., couplings) include parallel conductors (e.g., parallel wires or other electrically conductive paths). One embodiment of an electrical connection is a bus. One embodiment of a bus is a multiple conductor parallel bus, for example, where the conductors allow parallel (e.g., concurrent) transmittal of data thereon. The term electrical connection (e.g., interconnect or bus) may generally refer to one or more separate physical connections, communication lines and/or interfaces, shared connections, and/or point-to-point connections, which may be connected by appropriate bridges, hubs, adapters, and/or controllers.

Figure 1:
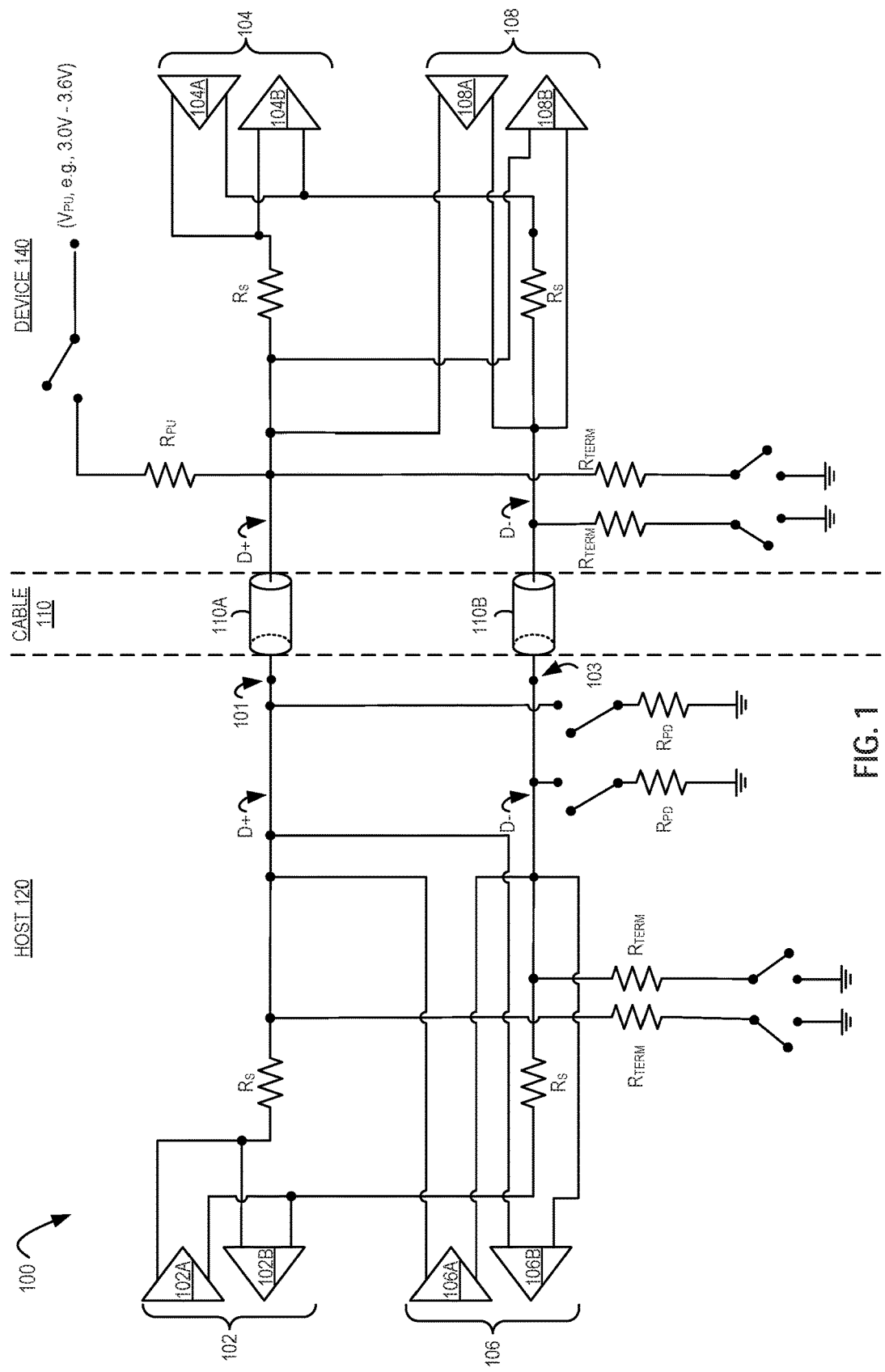
FIG. 1 illustrates a schematic diagram of a circuit including a host coupled to a device through a cable according to embodiments of the disclosure.
Figure 2:
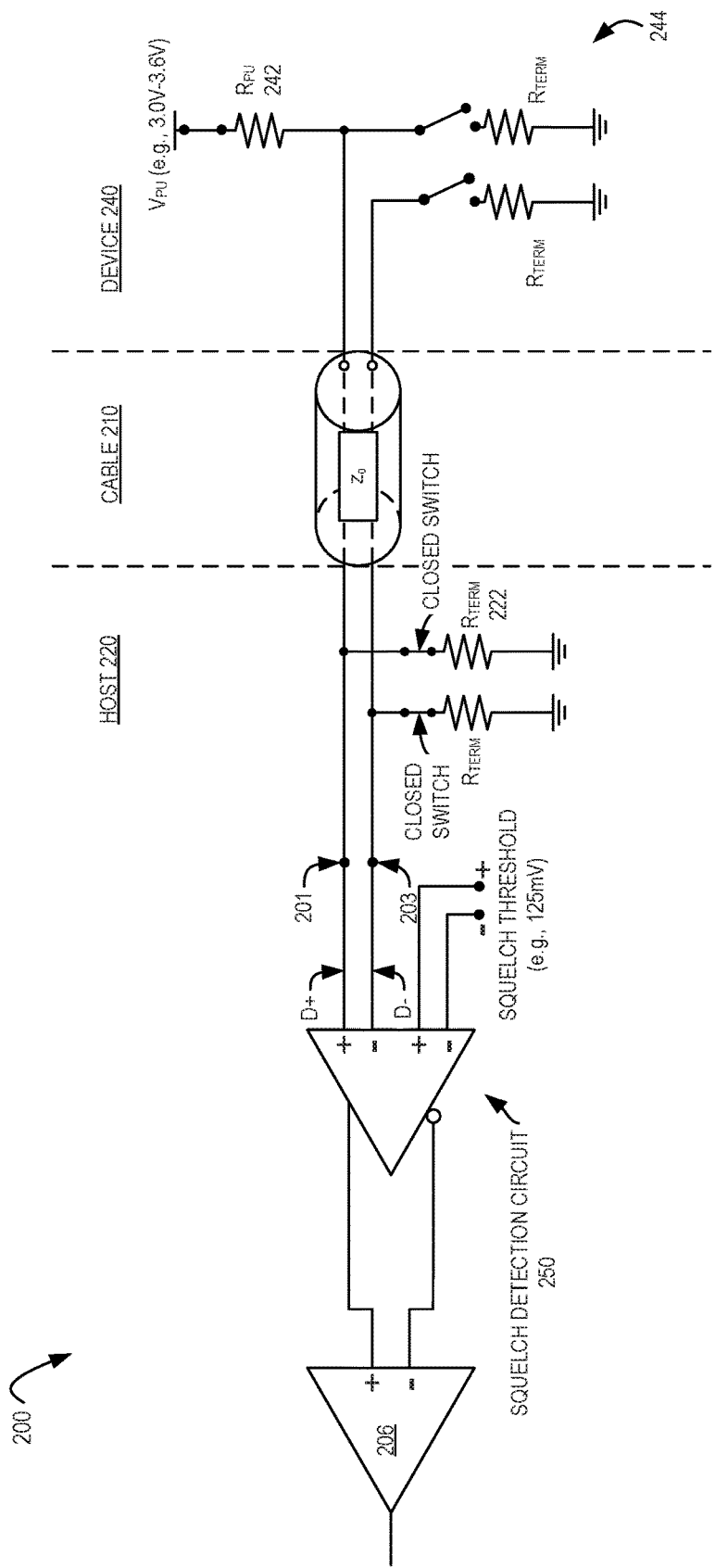
FIG. 2 illustrates a schematic diagram of a circuit including a host with a squelch detection circuit coupled to a device through a cable according to embodiments of the disclosure.

The phrase Universal Serial Bus (USB) generally refers to a cable bus that supports the transmittal of data between a USB host (e.g., host) and a one or more USB devices (e.g., peripherals or peripheral devices). A USB device may not include a USB host or USB hub. A USB cable is generally used to make the electrical connection between the USB host and the USB device, e.g., with one or more hubs therebetween. A USB controller may be part of a USB host (e.g., host circuit) or included as a component separate from the USB host (e.g., host circuit). Certain communication specifications (e.g., standards), for example, the USB specifications, may include the protocols for electronic devices to communicate with each other. For example, the USB 1.0 and 1.1 specifications support two different data transfer rate speeds: 1.5 megabits (Mbits) per second (Mbps) for low-speed devices (referred to as "LS" or low speed) and 12 MBits/second (Mbps) for full-speed devices (referred to as "FS" or full speed). The USB 2.0 (Hi-Speed USB) specification supports a speed of 480 Mbps (e.g., referred to as "HS" or high-speed). As will be discussed further below, the USB 2.0 (USB2) specification includes a USB high-speed (e.g., HS Chirp K) detection handshake between high-speed devices (e.g., between products, such as, between a USB host and a USB device) to indicate that each supports high-speed data transfer rates. Some devices (products), for example, mobile devices, may be both a USB host and a USB device, e.g., depending on what type of product the device is connected to. Turning to FIGS. 1-2, embodiments of circuitry (e.g., circuits) of a USB host and USB device are discussed.

FIG. 1 illustrates a schematic diagram of a circuit 100 including host 120 (e.g., a bus host) coupled to a device 140 (e.g., a bus device) through a cable 110 according to embodiments of the disclosure. The dotted lines indicating the cable 110, host 120, and device 140 portions of the circuit are merely examples and various components (e.g., switches, resistors, amplifiers, etc.) may be included in each portion and/or other portions. In the depicted embodiment in FIG. 1, the host 120 is coupled to the device 140 via cable 110. Depicted cable 110 includes a first conductor 110A to form a first data path between the host 120 and device 140 and a second conductor 110B to form a second data path between the host 120 and device 140. Although two conductors (e.g., signaling pairs) are depicted in cable 110, other conductors may be utilized, e.g., a ground and/or power (e.g., $V_{BUS}$). In FIG. 1, the first data path through 110A is the positive data path (e.g., D+) and the second data path is the negative data path (e.g., D−) which together D+ and D− may be referred to as a USB 2.0 differential pair. In certain embodiments herein, a data path(s) USB 3.0 or 3.1 specifications. In one embodiment, a first data path (e.g., for D+) and a second data path (e.g., for D−) have the same data transfer rate (e.g., speed).

In the depicted embodiment in FIG. 1, host 120 includes a first transceiver circuit 102 including a driver 102A and receiver 102B to respectively send and receive data, e.g., at or up to a first data rate. In the depicted embodiment in FIG. 1, device 140 includes a first transceiver circuit 104 including a driver 104A and receiver 104B to respectively send and receive data, e.g., at or up to a first data rate. In one embodiment, a first data rate includes low-speed (e.g., 1.5 Mbps) and/or full-speed (e.g., 12 Mbps) data transfer rates.

In the depicted embodiment in FIG. 1, host 120 includes a second transceiver circuit 106 including a driver 106A and receiver 106B to respectively send and receive data, e.g., at a second data rate. In the depicted embodiment in FIG. 1, device 140 includes a second transceiver circuit 108 including a driver 108A and receiver 108B to respectively send and receive data, e.g., at or up to a second data rate. In one embodiment, a second data rate includes high-speed (e.g., 480 Mbps) data transfer rates. A driver may be a constant voltage or constant current source. An Rs generally refers to a series damping resistor. An $R_{TERM}$ generally refers to a termination resistance (e.g., having a resistance of 40.5 ohms to 49.5 ohms or 45 ohms). In one embodiment, an $R_{TERM}$ includes $R_S$. In one embodiment, $R_{TERM}$ is 45 ohms. An $R_{PU}$ generally refers to a (e.g., weak) pull-up resistor (e.g., having a resistance of 900 ohms to 1575 ohms or 1500 ohms). An $R_{PD}$ generally refers to a pull-down resistor (e.g., having a resistance of 14.25 kilo ohms to 24.8 kilo ohms or 15 kilo ohms). Although the switches in FIG. 1 are illustrated in an open position (e.g., as opposed to a closed (completed electrical connection) position), each may be open or closed as desired. For example, switches, receivers, and/or transmitters may be controlled by a control circuit (not depicted). Control circuit may be a controller (for example, an external controller, e.g., external to the transceiver circuit and/or to the physical layer (PHY)), e.g., a USB controller. In certain embodiments, a control circuit (e.g., USB controller(s)) may test that the host and device are to operate at (e.g., up to) a data transfer rate value before operating at that value. For example, a USB host and a USB device may perform a USB high-speed (e.g., HS Chirp K) detection handshake between the USB host and the USB device to indicate that each supports high-speed data transfer rates. The depicted host 120 and device 140 may illustrate a portion of the circuitry of each, for example, a host and/or a device may include other components that are not depicted, e.g., the control inputs and data outputs of the receivers and drivers.

FIG. 2 illustrates a schematic diagram of a circuit 200 including a host 220 with a squelch detection circuit 250 coupled to a device 240 through a cable 210 according to embodiments of the disclosure. Although not depicted, the embodiment in FIG. 2 may include any or all of the components of FIG. 1. For example, the squelch detection circuit 250 may squelch a data signal (e.g., D+ or D−, or the differential of D+ and D−) unless the magnitude of the signal is at or greater than a squelch threshold (e.g., amplifier reference voltage). In one embodiment, a squelch threshold is a single value. In another embodiment, a squelch threshold is a range of values. In one embodiment, a squelch threshold is set (e.g., to 112.5 mV or 125 mV) such that if the difference between the data signals on the D+ data path (e.g., conductor) and the D− data path (e.g., conductor) is below (or equal to) the squelch threshold, the data signals on data paths D+ and D− are not passed to a receiver (e.g., receiver 206) and if the difference between the data signals on the D+ data path (e.g., conductor) and the D− data path (e.g., conductor) is above (or equal to) the squelch threshold, the data signals on data paths D+ and D− are passed to a receiver (e.g., receiver 206). In one embodiment, a squelch detection circuit 250 is to not pass a data signal (e.g., differential data signal) to a receiver when the difference between the two input signals (e.g., D+ and D−) is less than or equal to 100 mV, and is to pass the data signal (e.g., differential data signal) to the receiver when the difference between the two input signals (e.g., D+ and D−) is greater than or equal to 150 mV. Certain switches being closed (e.g., an electrical connection enabled) or open (e.g., the electrical connection disabled) in FIG. 2 are merely an embodiment and the circuit should not be so limited. $Z_0$ in FIG. 2 may represent the impedance of a connection (e.g., cable) between the host and device.

Figure 3:
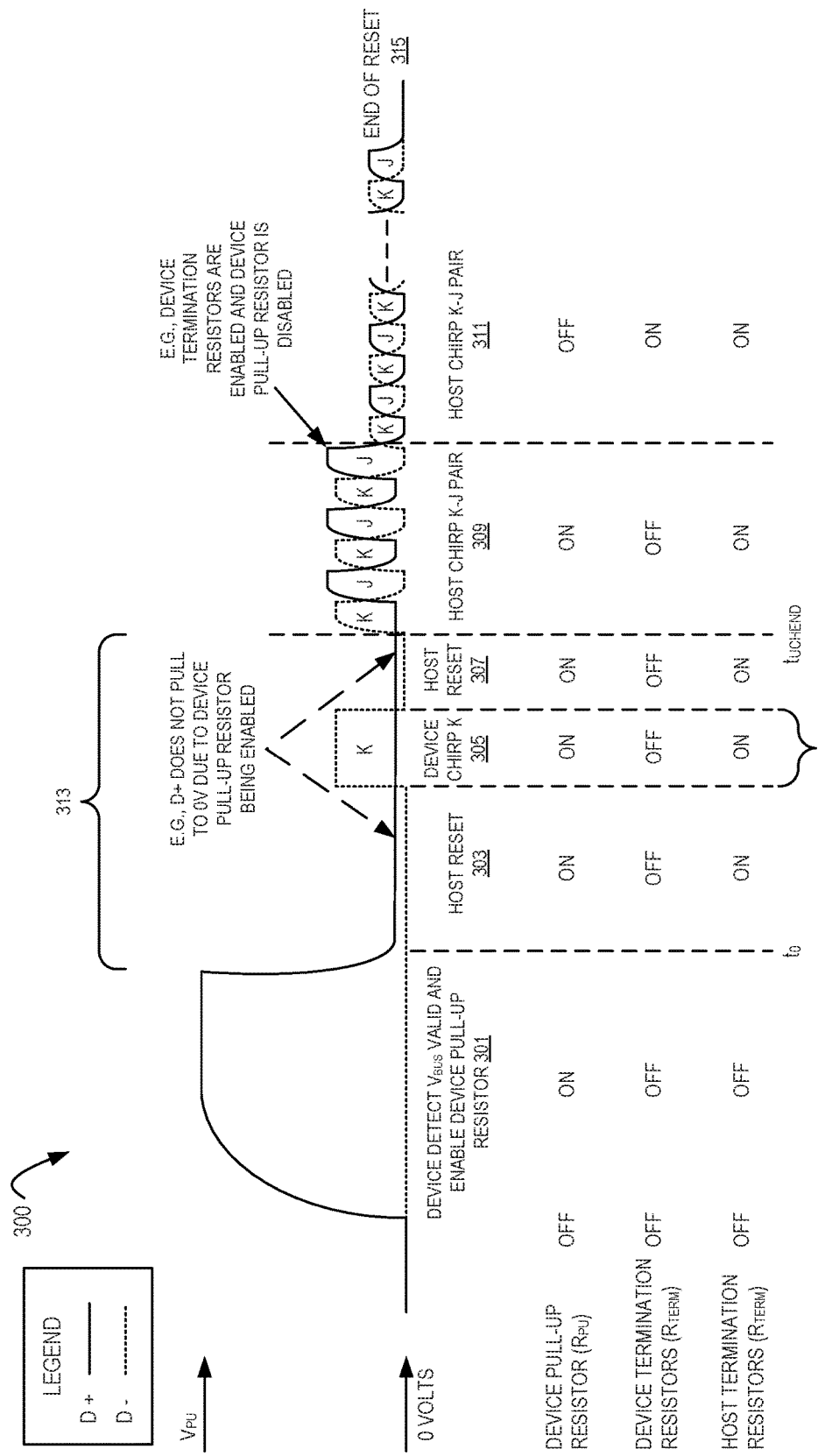
FIG. 3 illustrates a schematic diagram of a high-speed (HS) chirp sequence according to embodiments of the disclosure.

FIG. 3 illustrates a schematic diagram of a high-speed (HS) chirp sequence 300 according to embodiments of the disclosure. Referring to FIGS. 2 and 3 together, one embodiment of a USB host and a USB device performing a USB high-speed (e.g., HS Chirp K) detection handshake between the USB host and the USB device to indicate that each supports a different (e.g., high-speed) data transfer rate is discussed. A Chirp K may generally refer to a differential value (e.g., in volts) between two signals (e.g., D+ minus D−) being less than or equal to a threshold value or being within a range of values (e.g., −900 mV to −500 mV). A Chirp J may refer to a differential value (e.g., in volts) between two signals (e.g., D+ minus D−) being greater than or equal to a (e.g., different than Chirp K) threshold value or being within a (e.g., different than Chirp K) range of values (e.g., 700 mV to 1100 mV).

At 301 in FIG. 3, a device and host may be connected together, e.g., via cable 110 in FIG. 1 or cable 210 in FIG. 2. The device (e.g., device controller) may detect power, e.g., in the $V_{BUS}$ conductor, and cause the device's pull-up resistor to be connected (e.g., pull-up resistor 242 in FIG. 2 in the D+ data path) to the supply voltage (e.g., via a switch to connect to the pull-up voltage ($V_{PU}$) in FIG. 2). Host (e.g., host controller) may then detect (e.g., with a receiver of the host transceiver circuit) the pulled-up voltage on a conductor (e.g., on the D+ data path in FIG. 2) and perform a host reset 303 by connecting the host termination resistor (e.g., $R_{TERM}$ 222 in FIG. 2) or resistors into the data path to drive each connected path toward (e.g., logical) zero, for example, to drive both data paths (D+ and D−) toward zero (single ended zero (SE0)). The host reset 303 may cause the host (e.g., controller) to enter a different (e.g., high-speed) mode. If the device is capable of operating at the different (e.g., high-speed) mode, the device (e.g., controller) may, in response to the host reset 303, drive (e.g., via device driver) a Chirp K 305 (for example, D− pulled down, e.g., to about −800 mV, i.e., 800 mV in amplitude) to inform the host (e.g., host controller) that the device is capable of operating in the different (e.g., high-speed) mode. If the host side keeps its pull-down termination resistors ($R_{TERM}$) enabled, both D+ and D− wires are then pulled back to host reset 307 state after the device Chirp K signal ends. For example, respective host pull-down termination resistors ($R_{TERM}$) may be connected to the first (e.g., D+) and second (e.g., D−) data paths during the entire period 313 (e.g., in one embodiment, period 313 is a period to detect a device chirp to indicate to the host that the device is high-speed capable). Subsequently after detecting (e.g., via a host receiver) the Chirp K (e.g., of sufficient duration ($t_{UCH}$)), the host controller may then drive (for example, via a (e.g., high-speed) driver of the host transceiver) three pairs of chirp KJ pairs 309, for example, with an amplitude of about 800 mV. Device may then turn on its termination resistors ($R_{TERM}$), e.g., respective termination resistors 244 in FIG. 2, while host port may continue to further drive KJ pairs (e.g., packet) until the end of reset 315. The amplitude drop (e.g., to about 400 mV) is visible at 311 after device turns on its (e.g., pull-down) termination resistors. Note that the graph in FIG. 3 illustrates the amplitudes of the data signals and does not indicate the sign (e.g., positive or negative).

In another embodiment, the (e.g., high-speed) device (e.g., device controller) is to leave the D+ device pull-up resistor connected, leave the (e.g., high-speed) device termination resistors disabled (e.g., with the host termination resistors enabled), and drive the high-speed signaling current onto the D– data path (e.g., line). This creates a Chirp K on the USB bus. In certain embodiments, the device chirp is to last no less than 1.0 ms ($t_{UCH}$) and end no more than 7.0 ms ($t_{UCHEND}$) after high-speed Reset time $t_0$. The host may detect the device chirp after it has seen assertion of the Chirp K for no less than 2.5 μs. If the host does not detect a device chirp, it continues the assertion of SE0 (e.g., via host termination resistors being enabled and not driving a host signal onto D+ or D–) until the end of reset in one embodiment. In certain embodiments, e.g., no more than 100 μs after the bus leaves the Chirp K state, the host is to begin to send an alternating sequence of Chirp K's and Chirp J's, e.g., without any idle states on the bus between the K's and J's. In certain embodiments, this sequence continues until a time no more than 500 μs before and no less than 100 μs before the end of reset 315, e.g., to cause the bus to remains active and prevent the device from entering the high-speed Suspend state. In certain embodiments, each individual Chirp K and Chirp J lasts no less than 40 μs and no more than 60 μs. After completing the host chirp sequence, the host may assert the SE0 until end of (e.g., handshake) Reset (e.g., via host termination resistors being enabled and not driving a host signal onto D+ or D–). At the end of Reset, the hub may then transition to the high-speed Enabled state, e.g., without causing any transitions on the data lines. In certain embodiments, e.g., after the device completes its chirp K, the device attempts to detect the high-speed host KJ chirps. In one embodiment, the device is to see the sequence Chirp K-J-K-J-K-J in order to detect a valid hub chirp. Each individual Chirp K and Chirp J are to have a duration of no less than 2.5 μs in certain embodiments. In certain embodiments, if the device detects the sequence Chirp K-J-K-J-K-J, then no more than 500 μs after detection, the device is to disconnect the D+ device pull-up resistor, enable the device high-speed termination resistors ($R_{TERM}$), and enter the high-speed Default state. In certain embodiments, e.g., if the device has not detected the sequence Chirp K-J-K-J-K-J by a time no less than 1.0 ms and no more than 2.5 ms (TWTFS) after completing its own chirp, then the device is to revert to the full-speed Default state and wait for the end of Reset.

However, in periods where a pull-up resistor (e.g., pull-up resistor 242 in FIG. 2) is enabled and a termination resistor is enabled (e.g., host termination resistor 222 in FIG. 2), the signal (e.g., voltage) on the line (e.g., the D+ line in FIG. 2) may not be pulled all the way to zero. The D+ line in FIG. 2 is located between the pull-up resistor 242 and the termination resistor 222, and thus the voltage at D+ generally takes the value of:

$$V_{D+} = V_{PU} \times \left( \frac{R_{TERM}}{R_{TERM} + R_{PU} + R_{MISC}} \right) \quad (1)$$

for example, which is non-zero when $V_{PU}$ is non-zero. In certain embodiments where D– is zero, e.g., during the host reset 303 and 307 periods, the differential voltage of D+ minus D– thus become D+. In certain embodiments, $R_{MISC}$ may be zero or 1 ohms to 10 ohms. In certain embodiments, $V_{PU}$ may be in a range of 3.0V to 3.6V, $R_{TERM}$ may be 40.5 ohms to 49.5 ohms, and $R_{PU}$ may be 900 ohms to 1575 ohms. Certain edge case examples of this are illustrated below in Table 1.

TABLE 1

| High-Speed Port Reset Amplitude during Device Chirp K Period | | | | |
|---|---|---|---|---|
| Supply Voltage (at $V_{PU}$) | 3.6 V | 3.6 V | 3.0 V | 3.0 V |
| Device Pull-Up Resistance ($R_{PU}$) | 900Ω | 1575Ω | 900Ω | 1575Ω |
| Motherboard Traces and Platform component Resistance ($R_{MISC}$) | 1Ω | 10Ω | 1Ω | 10Ω |
| Host Termination Resistance ($R_{TERM}$) | 49.5Ω | 49.5Ω | 40.5Ω | 40.5Ω |
| D+ minus D– Voltage (e.g., D– = 0 V) | 187.5E-3 V | 109.0E-3 V | 129.0E-3 V | 74.7E-3 V |

Table 1 illustrates that the differential voltage (e.g., D– subtracted from D+) during the Device Chirp K portion of the host reset period (e.g., Device Chirp K 305 in FIG. 3) may vary (e.g., depending on the parameters which may be within the ranges of value discussed herein) from 74.7 mV to 187.5 mV. In certain embodiments, a non-zero voltage at D+ (e.g., 74.7 mV to 187.5 mV) may cause errors, for example, it may cause a squelch detection circuit (e.g., squelch detector) to incorrectly squelch a signal and/or to produce the opposite value that is expected. For example, a differential voltage of 74.7 mV to 187.5 mV, e.g., during the host reset 303 and 307 periods in FIG. 3 where the differential voltage becomes D+ (e.g., D+ minus D– where D– is zero), may be above the off threshold (e.g., 100 mV-150 mV) of the squelch detection circuit threshold and thus trigger a logical one (e.g., output the value of the differential pair) when a logical zero (e.g., output a zero) is expected. This may be referred to as a metastable state (e.g., bouncing between logical zero and one) that causes squelch detection circuit (e.g., a squelch detector) output dithering, e.g., such that a USB host fails to detect a USB device, e.g., fails to detect that the USB device is high-speed capable and downgrades the device to full-speed. For example, output dithering may cause a host controller to fail to proceed to the high-speed chirping JK phase (e.g., 309 and 311 in FIG. 3) of a USB high-speed (e.g., HS Chirp K) detection handshake. Note that with process, voltage, and temperature (PVT) variations, a squelch detection circuit threshold (e.g., squelch threshold) in certain embodiments is within 100 mV to 150 mV. Further discussion of this is below in reference to Table 3.

Referring to the embodiments in FIG. 3, the D− line is not pulled-up so its signal (e.g., voltage) is pulled all the way to zero when it is driven towards zero. In certain embodiments, a non-zero value on a data path (e.g., D+ in FIGS. 2 and 3) that is actively driven towards zero and a zero value on the other data path of a differential pair may be undesirable. For example, a controller(s) may send control signals for both differential pairs to be driven to zero (SE0), but the actual data path(s) in the circuit is not driven to logical zero.

Certain embodiments herein utilize circuitry (e.g., a pull-down circuit) to cause (e.g., the voltage on) the actual data paths (e.g., D+ and D−) to be driven to logical zero or logical one as expected (e.g., as the circuit is instructed to achieve by a controller), for example, during a USB high-speed (e.g., HS Chirp K) detection handshake (e.g., during at least a first host reset 303 period and/or second host reset 307 period thereof). In certain embodiments, circuitry (e.g., a pull-down circuit) is to cause (e.g., the voltage on) the actual data paths (e.g., D+ and D−) to be driven to logical zero or logical one for all possible ranges of component values (e.g., $V_{PU}$ may be in a range of 3.0V to 3.6V, $R_{TERM}$ may be 40.5 ohms to 49.5 ohms, and $R_{PU}$ may be 900 ohms to 1575 ohms).

In certain embodiments, a resistor (e.g., one or more of other resistors in a circuit, such as, but not limited to, a pull-down resistor(s)) may be utilized to lower the voltage in certain period(s), for example, to lower the voltage on one or more data paths (e.g., D+ and/or D−), e.g., to allow a squelch detection circuit to function as desired (e.g., to avoid metastable or other undesirable behavior). In certain embodiments, respective resistors on each data path are of the same resistance (e.g., as measure in ohms).

Certain embodiments herein cause (e.g., the voltage on) the actual data paths to be driven to logical zero or logical one as expected (e.g., as the circuit is controlled by a controller). Certain embodiments herein allow for a USB (e.g., external host and/or device) controller (e.g., separate from the physical layer (PHY)) and the USB transceiver circuit (e.g., the physical layer (PHY)) to be designed and/or manufactured by different parties, etc. and still provide for the actual data path(s) to be driven to logical zero (e.g., low) or logical one (e.g., high) as desired. Certain embodiments of (e.g., transceiver) circuits herein may be utilized by any host controller, for example, without any (e.g., data line) filters (e.g., noise filters), latches (e.g., clocked latches), and/or counters.

Certain (e.g., clockless) embodiments herein do not utilize a clock (e.g., no gates or latches that depend on a clock), for example, do not utilize a clock to prevent a metastable state or output dithering. Certain embodiments herein do not introduce any (e.g., significant) latency. Certain embodiments herein do not introduce any (e.g., significant) additional system timing.

Certain embodiments herein provide for a circuit (e.g., a USB PHY) that does not rely on a (e.g., host) controller to filter out any glitches (e.g., metastable behavior) from a squelch detection circuit, for example, during host reset in (e.g., high-speed) chirp sequences. Certain embodiments of the circuit utilize no (or minimal) additional power and/or area. Certain embodiments herein do not utilize any debounce (de-bounce) circuitry.

Certain embodiments of circuits herein may be located in a (e.g., USB2) PHY level. Certain embodiments herein may use a (e.g., host) transceiver (e.g., PHY) that is separate from a (e.g., host) controller.

Figure 4A:
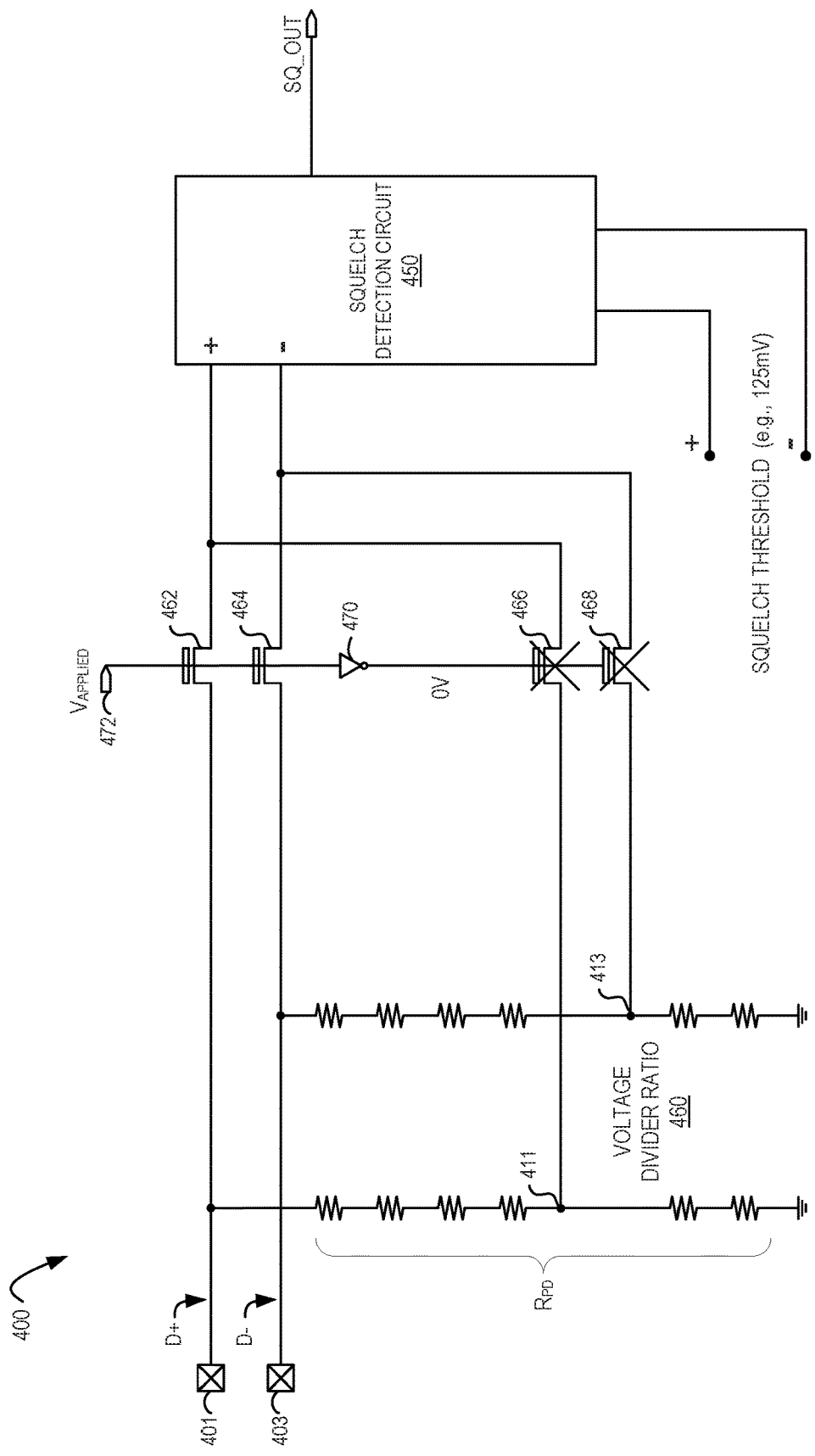
FIG. 4A illustrates a schematic diagram of a transceiver circuit in a first mode according to embodiments of the disclosure.
Figure 4B:
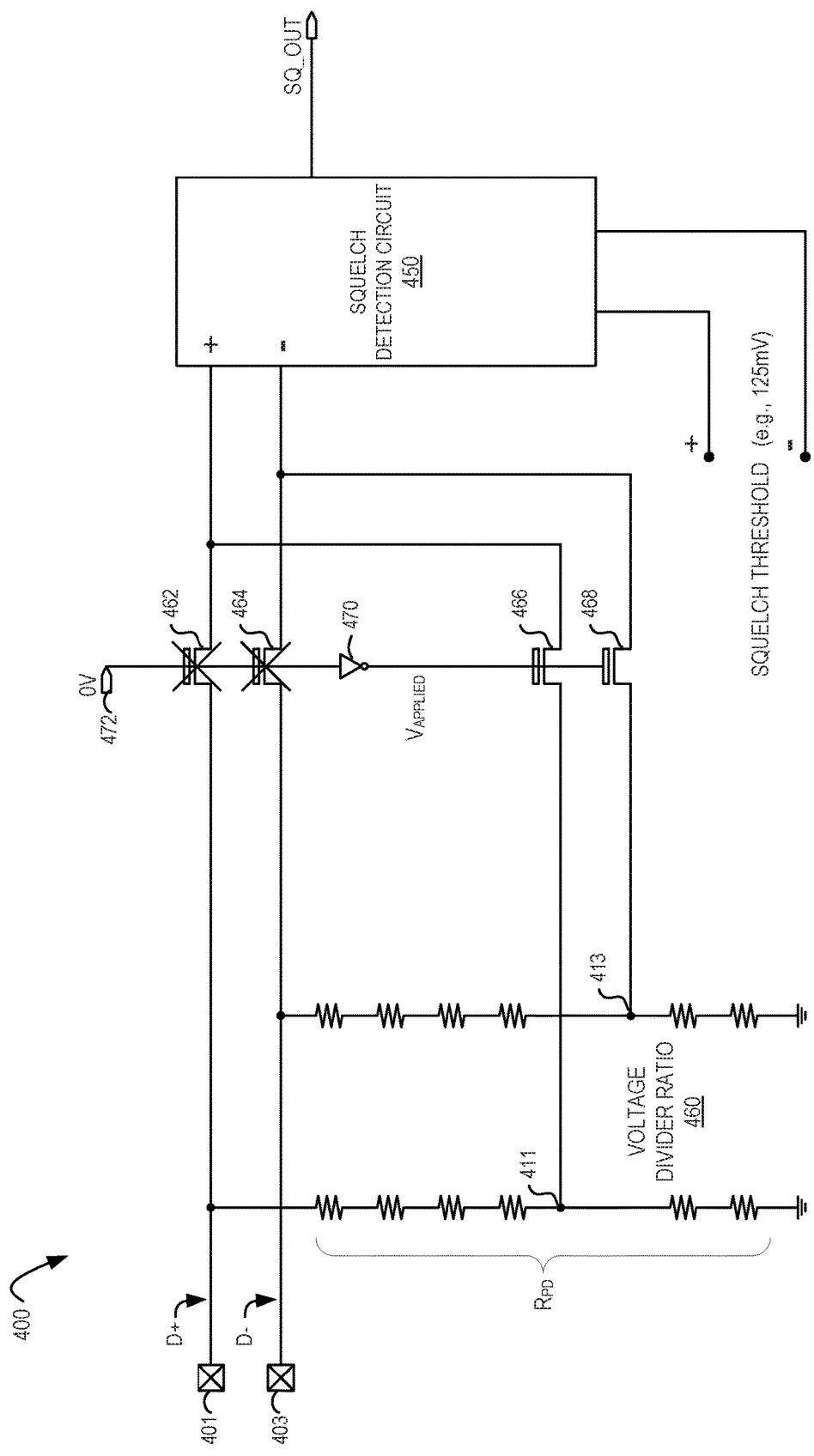
FIG. 4B illustrates a schematic diagram of a transceiver circuit in a second mode according to embodiments of the disclosure.

FIG. 4A illustrates a schematic diagram of a transceiver circuit 400 in a first mode according to embodiments of the disclosure. FIG. 4B illustrates a schematic diagram of a transceiver circuit 400 in a second mode according to embodiments of the disclosure. Referring to both FIGS. 4A and 4B, a squelch detection circuit 450 is included. Squelch detection circuit 450 (e.g., of a host) may be coupled to a device through a cable, e.g., according to embodiments of the disclosure. Although not depicted, the embodiment in FIGS. 4A and 4B may include any or all of the components of FIG. 1 or 2. In one embodiment, first data path at point 401 (e.g., D+) and second data path at point 403 (e.g., D−) connect into a USB circuit (e.g., the host or device), for example, first data path at point 401 may couple (e.g., connect) to point 201 in FIG. 2, e.g., to replace some or all the components to the left of point 201 and second data path at point 403 may couple (e.g., connect) to point 203 in FIG. 2, e.g., to replace some or all the components to the left of point 203. As a further example, first data path at point 401 may couple (e.g., connect) to point 101 in FIG. 1 and second data path at point 403 may couple (e.g., connect) to point 103 in FIG. 1, e.g., and replace the pull-down resistors (RPD) in FIG. 1. In one embodiment, the squelch detection circuit 450 may squelch a data signal (e.g., D+ or D−, or the differential of D+ and D−) unless the magnitude of the signal is at or greater than a squelch threshold (e.g., amplifier reference voltage). In one embodiment, a squelch threshold is set (e.g., to 112.5 mV or 125 mV) such that if the difference between the data signals on the D+ data path (e.g., conductor) and the D− data path (e.g., conductor) is below (e.g., or equal to) the squelch threshold, the data signals on data paths D+ and D− are not passed to a receiver and if the difference between the data signals on the D+ data path (e.g., conductor) and the D− data path (e.g., conductor) is above (e.g., or equal to) the squelch threshold, the data signals on data paths D+ and D− are passed to a receiver. In one embodiment, a squelch detection circuit 450 is to not pass a data signal (e.g., differential data signal) to a receiver when the difference between the two input signals (e.g., D+ and D−) is less than or equal to 100 mV or 150 mV, and is to pass the data signal (e.g., differential data signal) to the receiver when the difference between the two input signals (e.g., D+ and D−) is greater than or equal to 100 mV or 150 mV, respectively.

In certain embodiments, for example, during a USB high-speed (e.g., HS Chirp K) detection handshake (e.g., during at least a first host reset 303 period and/or second host reset 307 period thereof), the (e.g. host) pull-down resistors ($R_{PD}$) may be coupled (e.g., enabled) to each data path. Although each set of $R_{PD}$ resistors is shown in FIGS. 4A-4B as having six resistors, in certain embodiments, any plurality of resistors may be utilized. For example, although a single resistor may be shown schematically in certain Figures, a plurality of resistors (e.g., in series) may be utilized to obtain a resistive value (e.g., as measured in ohms). In one embodiment, each $R_{PD}$, e.g., on a single data line, has a total resistance of 14.25 kilo ohms to 15.75 kilo ohms or 15 kilo ohms total from a plurality of resistors.

In the first mode depicted in FIG. 4A, switch 462 and switch 464 (e.g., MOSFET switches) are closed (e.g., forming an electrical connection thereacross) and switch 466 and 468 are open (e.g., preventing an electrical connection thereacross), for example, these switches cumulatively referred to as a switching circuit. As such, the squelch detection circuit 450 may sense (e.g., detect with a sensor(s)) at its respective (e.g., D+ and D−) inputs, the signal (e.g., voltage) at points 401 and 403, e.g., from the respective data paths between a connected device and host. This may be referred to as a first data path to the squelch detection circuit.

In the second mode depicted in FIG. 4B, switch 462 and switch 464 (e.g., MOSFET switches) are open (e.g., preventing an electrical connection thereacross) and switch 466 and 468 are closed (e.g., forming an electrical connection thereacross). As such, the squelch detection circuit 450 may sense (e.g., detect with a sensor(s)) at its respective (e.g., D+ and D−) inputs, a reduced signal (e.g., voltage) relative to points 401 and 403, e.g., from the respective data paths between a connected device and host. This may be referred to as a second (e.g., reduced voltage) data path to the squelch detection circuit. Although two voltage divider circuits are depicted, a single voltage divider circuit may be utilized (e.g., one on either of the D+ or D− data paths). In certain embodiments, the second data path may have its own resistor(s) (e.g., not part of a pull-down resistor or set of pull-down resistors).

In one embodiment, each voltage divider circuit (e.g., based on each voltage divided ratio) is to step down the input voltage from 401 and 403, respectively. For example, if the resistors in series have a same resistance, the output at point 411 is one-third of the voltage at point 401:

$$V_{@411} = V_{@401} \times \left(\frac{2R}{2R + 4R}\right) = V_{@401} \times \left(\frac{1}{3}\right) \quad (2)$$

Similarly, if the resistors in series have a same resistance, the output at point 413 is one-third of the voltage at point 403. The number of resistors and/or where to tap into them to create the voltage divider ratio 460 on each set of resistors may be a design choice. For example, the voltage divider ratio and/or resistance values may be selected (e.g., during manufacture or adjustable during set-up or use of a circuit) to step down the voltage into the squelch detection circuit, for example, to ensure that a logical zero command from a controller causes the squelch detection circuit to output a logical zero and/or to ensure that a logical one (e.g., non-zero) command from a controller causes the squelch detection circuit to output a logical one.

In one embodiment, the squelch output (sq_out) is a control signal to cause a receiver (e.g., a host receiver) to disable data recovery when the input data (e.g., differential voltage received at the inputs into the squelch detection circuit 450) into the squelch detection circuit 450 is below (or equal) to the squelch (detection) threshold and/or enable data recovery when the input data (e.g., differential voltage received at the inputs into the squelch detection circuit 450) into the squelch detection circuit 450 is above (or equal) to the squelch (detection) threshold.

In FIGS. 4A and 4B, the switches are controlled by the input port 472, e.g., by providing or not providing the applied voltage ($V_{APPLIED}$). The NOT gate (invertor) 470 may be used such that switches 466 and 468 are in the opposite (e.g., closed or open) state than switches 462 and 464. In one embodiment, the applied voltage (e.g., to turn on a switch) is sent from a control circuit (not depicted). Although FIGS. 4A and 4B depict the applied voltage turning on switches 462 and 464 and turning off switches 466 and 468, in another embodiment, an applied (for example, high instead of low (e.g., zero)) voltage turns on switches 462 and 464 and turns off switches 466 and 468. For example, a control circuit may detect entry into a certain period (e.g., a period of a USB high-speed (e.g., HS Chirp K) detection handshake) and then cause a switch or switches to be open or closed. In one embodiment, on (e.g., detection of) entry into a USB high-speed (e.g., HS Chirp K) detection handshake period, a (e.g., host) controller (e.g., circuit) is to assert a chirp enable indicator to the (e.g., host) transceiver circuit (e.g., PHY), for example, when the (e.g., host) controller detects a device connected, e.g., via D+ going high (e.g., as a signal at D+ data path). One example of D+ going high while D− is kept at zero is at 301 in FIG. 3. In certain embodiments, the chirp enable indicator may thus be utilized (e.g., as a signal input into input port 472) to switch the switches into a desired position (e.g., into a first mode as in FIG. 4A and a second mode as in FIG. 4B). For example, a chirp enable indicator going high (e.g., $V_{APPLIED}$) may cause a transition from the first (e.g., default) mode into the second mode, e.g., until the chirp enable indicator does low and/or the end of the handshake period is detected.

In another embodiment, each switch may be controlled individually, e.g., independent of the other switches. For example, switch 464 and switch 466 may be closed (e.g., forming an electrical connection thereacross) and switch 462 and switch 468 may be open (e.g., preventing an electrical connection thereacross) or switch 462 and switch 468 may be closed (e.g., forming an electrical connection thereacross) and switch 464 and switch 466 may be open (e.g., preventing an electrical connection thereacross).

A switch or switches may be controlled by a control circuit (not depicted). A switch or switches may be controlled by a control circuit to route the data path(s) through one or more resistors (e.g., less than all of the pull-down resistors on a data path) when a connected USB host and USB device are in a period to detect a high-speed device signal (e.g., any or all of periods 303, 305, and 307 (cumulatively period 313) in FIG. 3). For example, a control circuit (e.g., of a switching circuit) may switch the switches from a first mode to a second mode (e.g., in any or all of periods 303, 305, and 307 (cumulatively period 313) in FIG. 3) to reduce the voltage at an input of a squelch detection circuit below a (e.g., off) squelch threshold. In one embodiment, a circuit may remain in a second mode during any or all of periods 303, 305, 307, 309, and 311 in FIG. 3. In one embodiment, a squelch threshold is set by a (e.g., host) controller. In certain embodiments, a squelch (detection) threshold is the same level in both of a first mode (e.g., as in FIG. 4A) and second mode (e.g., as in FIG. 4B). In certain embodiments, a high-speed chirp (e.g., device chirp K 305 in FIG. 3) may run at a (e.g., very low) frequency (e.g., each K or J symbol less than 100 kHz), for example, such that the resistor and capacitor (RC) effect introduced by the second mode resistor path (e.g., as in FIG. 4B) is negligible. Table 2 below includes examples of parameters that may be used herein:

TABLE 2

High-Speed Chirp J/K Levels

| Parameter | Min | Max | Units |
|---|---|---|---|
| Chirp J Level (Differential Voltage of D+ and D−) | 700 | 1100 | mV |
| Chirp K Level (Differential Voltage of D+ and D−) | −900 | −500 | mV |
| High-Speed Squelch Detection Threshold (Differential Voltage (amplitude) of D+ and D−) | 100 | 150 | mV |

Table 3 below includes an example of switching from a first mode (e.g., a first path) to a second mode (e.g., a second path) to reduce the voltage on data lines (e.g., at the input of a squelch detection circuit) to avoid errors (e.g., metastability).

TABLE 3

Signal Amplitude at a Squelch Detection Circuit During
Two Modes of Operation of a Voltage Reduction Circuit

| Parameter | Min | Max | Units | Squelch Detection Circuit Output with Squelch Threshold of 125 mV |
|---|---|---|---|---|
| First Mode (e.g., as in Figure 4A) (e.g., without voltage divider) | | | | |
| Chirp K Level (Differential Voltage of D+ and D−) | −900 | −500 | mV | logic "1" |
| Host Reset Amplitude (e.g., during HS chirp) | 74.7 | 187.5 | mV | Metastability |
| Second Mode (e.g., as in Figure 4B) (e.g., after voltage divider) | | | | |
| Chirp K Level (Differential Voltage of D+ and D−) | −300 | −167 | mV | logic "1 |
| Host Reset Amplitude (e.g., during HS chirp) | 24.9 | 62.5 | mV | logic "0" |

As shown in Table 3, a non-zero host (e.g., port) reset amplitude (e.g., during device chirp K 305 in FIG. 3) after passing thru the $R_{PD}$ resistor divider path (e.g., with a 0.33 ratio in this example) varies from 24.9 mV to 62.5 mV (e.g., as opposed to 74.7 mV to 187.5 mV without passing the through resistor divider path). This 24.9 mV to 62.5 mV amplitude is smaller than the squelch (detection) threshold (e.g., 100 mV to 150 mV) and thus the squelch detection circuit is to output a logic zero, for example, to remove the metastability issue discussed herein. In one embodiment, even if the device chirp K (e.g., device chirp K 305 in FIG. 3) is to pass through the resistor divider path, the device chirp K amplitude is −300 mV to −167 mV, which is above a 150 mV squelch (e.g., amplitude) detection threshold (e.g., no squelch is enabled) and thus the squelch detection circuit is to output a logic one, for example, such that the (e.g., non voltage divided) value from points 401 and 403 may be output to a (e.g., host) receiver. In certain embodiments, a voltage divider ratio selection allows a squelch detection circuit to work in either of the first mode and second mode with the same squelch threshold (e.g., reference voltage).

Figure 5:
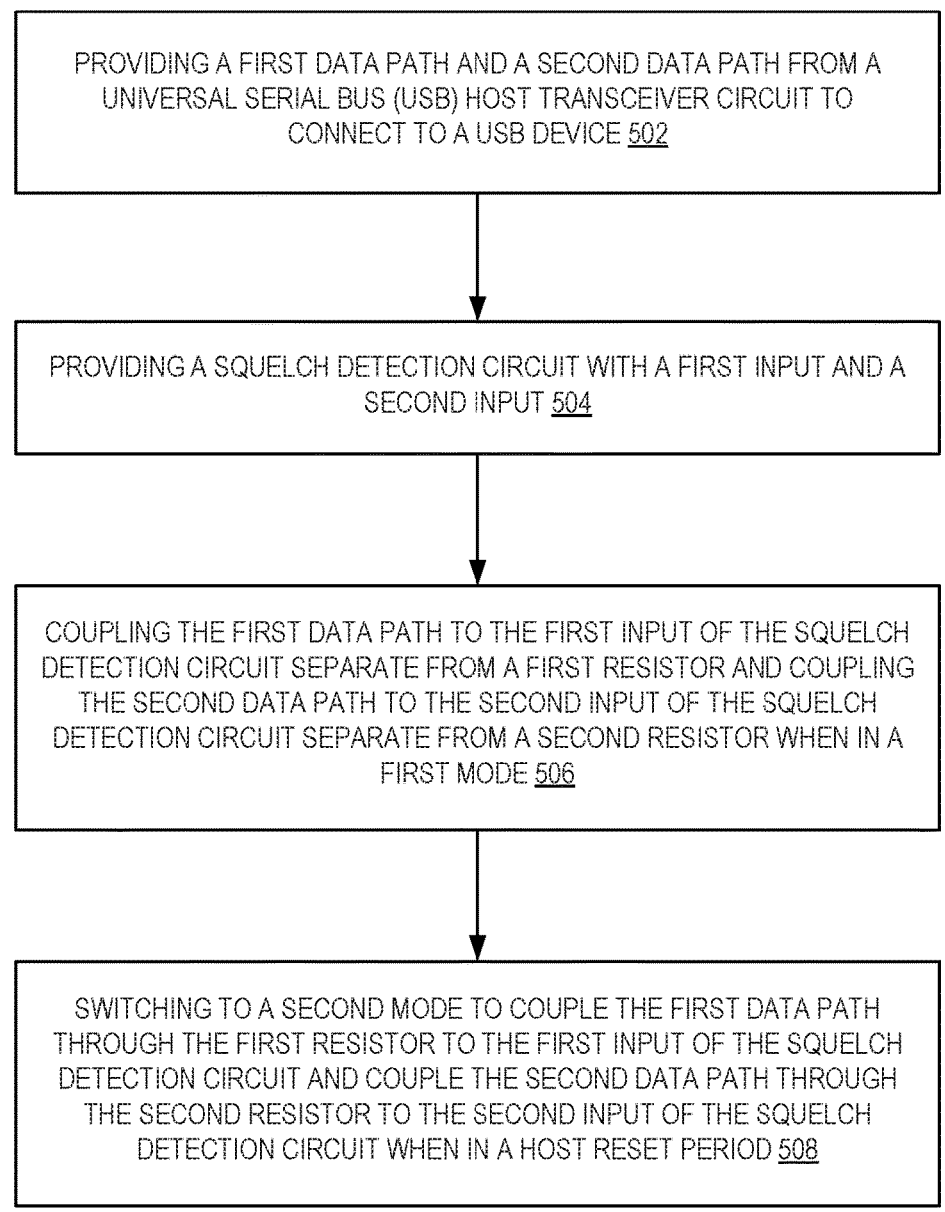
FIG. 5 illustrates a flow diagram according to embodiments of the disclosure.

FIG. 5 illustrates a flow diagram 500 according to embodiments of the disclosure. Depicted flow 500 includes providing a first data path and a second data path from a Universal Serial Bus (USB) host transceiver circuit to connect to a USB device 502, providing a squelch detection circuit with a first input and a second input 504, coupling the first data path to the first input of the squelch detection circuit separate from a first resistor and coupling the second data path to the second input of the squelch detection circuit separate from a second resistor when in a first mode 506, and switching to a second mode to couple the first data path through the first resistor to the first input of the squelch detection circuit and couple the second data path through the second resistor to the second input of the squelch detection circuit when in a host reset period 508.

Figure 6:
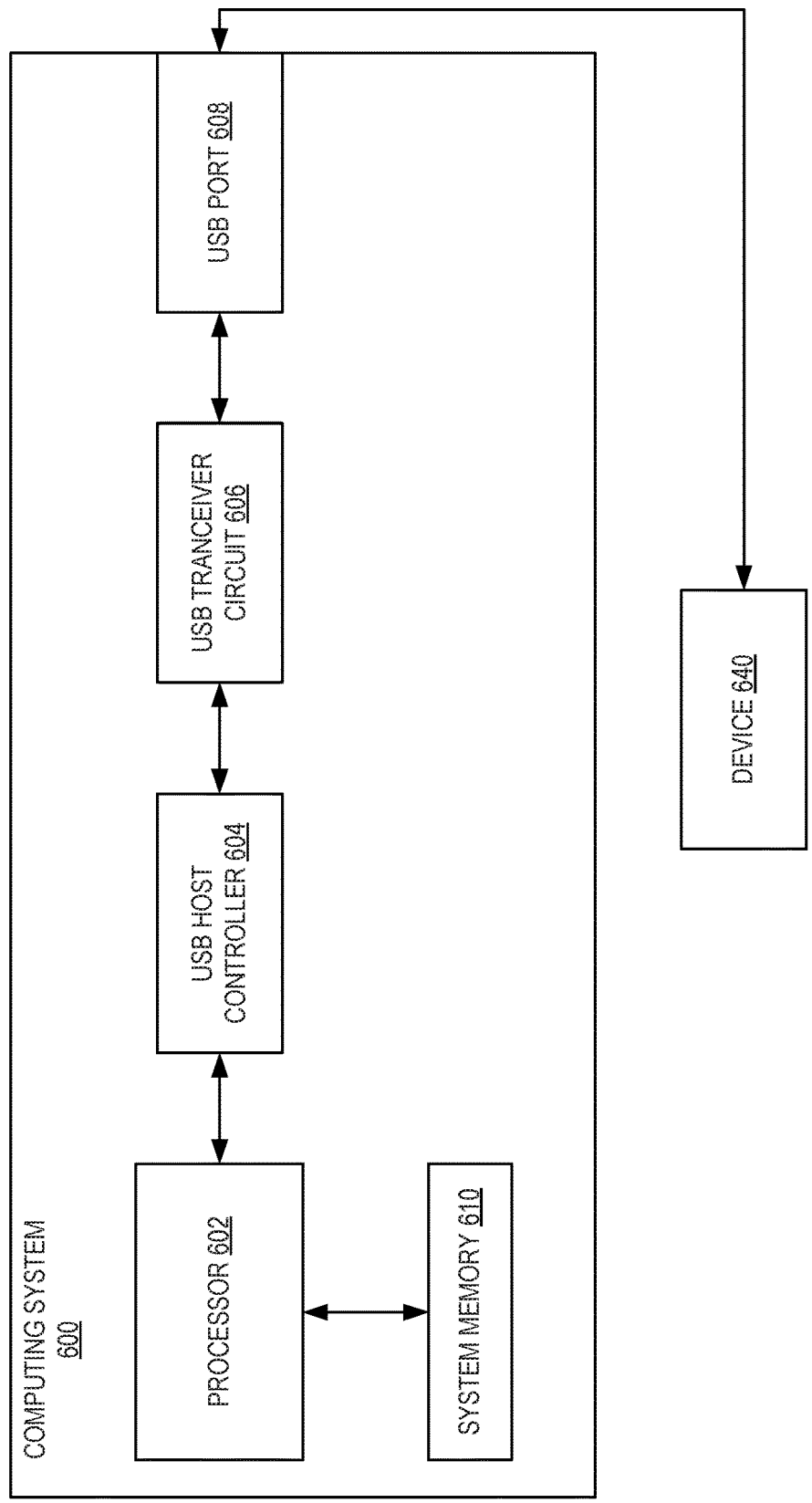
FIG. 6 illustrates a block diagram of a computing system according to embodiments of the disclosure.

FIG. 6 illustrates a block diagram of a computing system 600 according to embodiments of the disclosure. Depicted computing system 600 includes a hardware processor 602 coupled to a system memory 610 and a USB host controller 604. A USB host may include one or more of the controller 604, transceiver circuit 606, and port 608. In one embodiment, a host controller 604 is separate from (e.g., external to) a transceiver circuit 606 (e.g., PHY). USB port 608 may provide a connection (e.g., via a USB cable) to a device 640. Although not depicted, device 640 may include a transceiver circuit, host controller, and/or port, for example, as discussed in reference to FIGS. 1 and 2. In one embodiment, transceiver circuit 606 may include one or more of the components discussed above. For example, a transceiver circuit may include one or more of the components in FIGS. 1, 2, and/or 4A-4B. A computing system may include any or all of the depicted components.

In one embodiment, a bus (e.g., Universal Serial Bus (USB)) host transceiver circuit includes a first data path to connect to a bus (e.g., USB) device, a second data path to connect to the bus device, a squelch detection circuit with a first input and a second input, and a switching circuit to couple the first data path to the first input of the squelch detection circuit separate from a first resistor and couple the second data path to the second input of the squelch detection circuit separate from a second resistor when in a first mode, and switch to a second mode to couple the first data path through the first resistor to the first input of the squelch detection circuit and couple the second data path through the second resistor to the second input of the squelch detection circuit when in a host reset period (e.g., of a high-speed detection handshake). The first resistor may be one (e.g., less than all) of a first plurality of pull-down resistors coupled to the first data path. Additionally or alternatively, the second resistor may be one (e.g., less than all) of a second plurality of pull-down resistors coupled to the second data path. The first resistor may be less than all of a first plurality of pull-down resistors coupled to the first data path to form a first voltage divider circuit and/or the second resistor may be less than all of a second plurality of pull-down resistors coupled to the second data path to form a second voltage divider circuit. The first voltage divider circuit and the second voltage divider circuit may decrease a differential voltage between the first data path and the second data path below an off threshold of the squelch detection circuit in the host reset period. The first resistor and the second resistor may decrease a differential voltage between the first data path and the second data path below an off threshold of the squelch detection circuit in the host reset period. An external host controller may drive the first data path and the second data path toward a logical zero in the host reset period. A pull-up resistor of the bus device and a termination resistor may be coupled to the first data path in the host reset period.

In another embodiment, a method includes providing a first data path and a second data path from a bus (e.g., Universal Serial Bus (USB)) host transceiver circuit to connect to a bus (e.g., USB) device, providing a squelch detection circuit with a first input and a second input, coupling the first data path to the first input of the squelch detection circuit separate from a first resistor and coupling the second data path to the second input of the squelch detection circuit separate from a second resistor when in a first mode, and switching to a second mode to couple the first data path through the first resistor to the first input of the squelch detection circuit and couple the second data path through the second resistor to the second input of the squelch detection circuit when in a host reset period (e.g., of a high-speed detection handshake). The first resistor may be one (e.g., less than all) of a first plurality of pull-down resistors coupled to the first data path. Additionally or alternatively, the second resistor may be one (e.g., less than all) of a second plurality of pull-down resistors coupled to the second data path. The first resistor may be less than all of a first plurality of pull-down resistors coupled to the first data path to form a first voltage divider circuit and/or the second resistor may be less than all of a second plurality of pull-down resistors coupled to the second data path to form a second voltage divider circuit. The first voltage divider circuit and the second voltage divider circuit may decrease a differential voltage between the first data path and the second data path below an off threshold of the squelch detection circuit in the host reset period. The first resistor and the second resistor may decrease a differential voltage between the first data path and the second data path below an off threshold of the squelch detection circuit in the host reset period. An external host controller may drive the first data path and the second data path toward a logical zero in the host reset period. A pull-up resistor of the bus device and a termination resistor may be coupled to the first data path in the host reset period.

In yet another embodiment, a computing system includes a processor coupled to a system memory, and a bus (e.g., Universal Serial Bus (USB)) host transceiver circuit including a first data path to connect to a bus (e.g., USB) device, a second data path to connect to the bus device, a squelch detection circuit with a first input and a second input, and a switching circuit to couple the first data path to the first input of the squelch detection circuit separate from a first resistor and couple the second data path to the second input of the squelch detection circuit separate from a second resistor when in a first mode, and switch to a second mode to couple the first data path through the first resistor to the first input of the squelch detection circuit and couple the second data path through the second resistor to the second input of the squelch detection circuit when in a host reset period (e.g., of a high-speed detection handshake). The first resistor may be one (e.g., less than all) of a first plurality of pull-down resistors coupled to the first data path. Additionally or alternatively, the second resistor may be one (e.g., less than all) of a second plurality of pull-down resistors coupled to the second data path. The first resistor may be less than all of a first plurality of pull-down resistors coupled to the first data path to form a first voltage divider circuit and/or the second resistor may be less than all of a second plurality of pull-down resistors coupled to the second data path to form a second voltage divider circuit. The first voltage divider circuit and the second voltage divider circuit may decrease a differential voltage between the first data path and the second data path below an off threshold of the squelch detection circuit in the host reset period. The first resistor and the second resistor may decrease a differential voltage between the first data path and the second data path below an off threshold of the squelch detection circuit in the host reset period. An external host controller may drive the first data path and the second data path toward a logical zero in the host reset period. A pull-up resistor of the bus device and a termination resistor may be coupled to the first data path in the host reset period.

In another embodiment, an apparatus includes a first data path to connect to a bus (e.g., USB) device, a second data path to connect to the bus device, a squelch detection circuit with a first input and a second input, and means to couple the first data path to the first input of the squelch detection circuit separate from a first resistor and couple the second data path to the second input of the squelch detection circuit separate from a second resistor when in a first mode, and switch to a second mode to couple the first data path through the first resistor to the first input of the squelch detection circuit and couple the second data path through the second resistor to the second input of the squelch detection circuit when in a host reset period.

In yet another embodiment, an apparatus comprises a data storage device that stores code that when executed by a hardware processor causes the hardware processor to perform any method disclosed herein. An apparatus may be as described in the detailed description. A method may be as described in the detailed description.

Embodiments (e.g., of the mechanisms) disclosed herein may be implemented in hardware (e.g., a computer programmed to perform a method may be as described in the detailed description), software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be executed to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. The mechanisms described herein are not limited in scope to any particular programming language. The language may be a compiled or interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, which may be generally referred to as "IP cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

What is claimed is:
1. A bus host transceiver circuit comprising:
 a first data path to connect to a bus device;
 a second data path to connect to the bus device;
 a squelch detection circuit with a first input and a second input; and a switching circuit to couple the first data path to the first input of the squelch detection circuit separate from a first resistor and couple the second data path to the second input of the squelch detection circuit separate from a second resistor when in a first mode, and switch to a second mode to couple the first data path through the first resistor to the first input of the squelch detection circuit and couple the second data path through the second resistor to the second input of the squelch detection circuit when in a host reset period, wherein the first resistor comprises one of, and less than all of, a first plurality of pull-down resistors coupled to the first data path.

2. The bus host transceiver circuit of claim 1, wherein the first resistor is a plurality of, and less than all of, the first plurality of pull-down resistors coupled to the first data path.

3. The bus host transceiver circuit of claim 1, wherein the second resistor comprises one of, and less than all of, a second plurality of pull-down resistors coupled to the second data path.

4. The bus host transceiver circuit of claim 1, wherein the first resistor comprises one of, and less than all of, the first plurality of pull-down resistors coupled to the first data path to form a first voltage divider circuit and the second resistor comprises one of, and less than all of, a second plurality of pull-down resistors coupled to the second data path to form a second voltage divider circuit.

5. The bus host transceiver circuit of claim 4, wherein the first voltage divider circuit and the second voltage divider circuit decrease a differential voltage between the first data path and the second data path below an off threshold of the squelch detection circuit in the host reset period.

6. The bus host transceiver circuit of claim 1, wherein the first resistor and the second resistor decrease a differential voltage between the first data path and the second data path below an off threshold of the squelch detection circuit in the host reset period.

7. The bus host transceiver circuit of claim 6, wherein an external host controller is to drive the first data path and the second data path toward a logical zero in the host reset period.

8. The bus host transceiver circuit of claim 1, wherein a pull-up resistor of the bus device and a termination resistor are coupled to the first data path in the host reset period.

9. A method comprising:
providing a first data path and a second data path from a bus host transceiver circuit to connect to a bus device;
providing a squelch detection circuit with a first input and a second input;
coupling the first data path to the first input of the squelch detection circuit separate from a first resistor and coupling the second data path to the second input of the squelch detection circuit separate from a second resistor when in a first mode, the first resistor comprising one of, and less than all of, a first plurality of pull-down resistors coupled to the first data path; and
switching to a second mode to couple the first data path through the first resistor to the first input of the squelch detection circuit and couple the second data path through the second resistor to the second input of the squelch detection circuit when in a host reset period.

10. The method of claim 9, wherein the first resistor is a plurality of, and less than all of, the first plurality of pull-down resistors coupled to the first data path.

11. The method of claim 9, wherein the second resistor comprises one of, and less than all of, a second plurality of pull-down resistors coupled to the second data path.

12. The method of claim 9, wherein the first resistor comprises one of, and less than all of, the first plurality of pull-down resistors coupled to the first data path to form a first voltage divider circuit and the second resistor comprises one of, and less than all of, a second plurality of pull-down resistors coupled to the second data path to form a second voltage divider circuit.

13. The method of claim 12, wherein the first voltage divider circuit and the second voltage divider circuit decrease a differential voltage between the first data path and the second data path below an off threshold of the squelch detection circuit in the host reset period.

14. The method of claim 9, wherein the first resistor and the second resistor decrease a differential voltage between the first data path and the second data path below an off threshold of the squelch detection circuit in the host reset period.

15. The method of claim 14, wherein an external host controller is to drive the first data path and the second data path toward a logical zero in the host reset period.

16. The method of claim 9, wherein a pull-up resistor of the bus device and a termination resistor of the bus host transceiver circuit are coupled to the first data path in the host reset period.

17. A computing system comprising:
a processor coupled to a system memory; and
a bus host transceiver circuit comprising:
a first data path to connect to a bus device,
a second data path to connect to the bus device,
a squelch detection circuit with a first input and a second input, and
a switching circuit to couple the first data path to the first input of the squelch detection circuit separate from a first resistor and couple the second data path to the second input of the squelch detection circuit separate from a second resistor when in a first mode, and switch to a second mode to couple the first data path through the first resistor to the first input of the squelch detection circuit and couple the second data path through the second resistor to the second input of the squelch detection circuit when in a host reset period, wherein the first resistor comprises one of, and less than all of, a first plurality of pull-down resistors coupled to the first data path.

18. The computing system of claim 17, wherein the first resistor is a plurality of, but less than all of, the first plurality of pull-down resistors coupled to the first data path.

19. The computing system of claim 17, wherein the second resistor comprises one of, and less than all of, a second plurality of pull-down resistors coupled to the second data path.

20. The computing system of claim 17, wherein the first resistor comprises one of, and less than all of, the first plurality of pull-down resistors coupled to the first data path to form a first voltage divider circuit and the second resistor comprises one of, and less than all of, a second plurality of pull-down resistors coupled to the second data path to form a second voltage divider circuit.

21. The computing system of claim 20, wherein the first voltage divider circuit and the second voltage divider circuit decrease a differential voltage between the first data path and the second data path below an off threshold of the squelch detection circuit in the host reset period.

22. The computing system of claim 17, wherein the first resistor and the second resistor decrease a differential voltage between the first data path and the second data path below an off threshold of the squelch detection circuit in the host reset period.

23. The computing system of claim 22, wherein an external host controller is to drive the first data path and the second data path toward a logical zero in the host reset period.

24. The computing system of claim 17, wherein a pull-up resistor of the bus device and a termination resistor are coupled to the first data path in the host reset period.

* * * * *